United States Patent
Proum

(10) Patent No.: US 7,587,632 B2
(45) Date of Patent: Sep. 8, 2009

(54) HIGH AVAILABILITY, HIGH PERFORMANCE SOFTWARE COMPONENT ARCHITECTURE

(75) Inventor: Chauk-Mean Proum, Antony (FR)

(73) Assignee: Thales (FR)

( * ) Notice: Subject to any disclaimer, the term of this patent is extended or adjusted under 35 U.S.C. 154(b) by 0 days.

(21) Appl. No.: 11/572,567

(22) PCT Filed: Jul. 19, 2005

(86) PCT No.: PCT/EP2005/053480

§ 371 (c)(1),
(2), (4) Date: Jan. 23, 2007

(87) PCT Pub. No.: WO2006/010726

PCT Pub. Date: Feb. 2, 2006

(65) Prior Publication Data

US 2008/0141248 A1    Jun. 12, 2008

(30) Foreign Application Priority Data

Jul. 23, 2004    (FR) ................................. 04 08191

(51) Int. Cl.
*G06F 11/00* (2006.01)
(52) U.S. Cl. .................. 714/10; 714/2; 714/11; 714/13; 714/15; 714/16
(58) Field of Classification Search .............. 714/2, 714/10, 11, 13, 15, 16
See application file for complete search history.

(56) References Cited

U.S. PATENT DOCUMENTS

| | | | |
|---|---|---|---|
| 5,799,323 A | | 8/1998 | Mosher, Jr. et al. |
| 5,951,694 A | * | 9/1999 | Choquier et al. ............. 714/10 |
| 5,968,185 A | * | 10/1999 | Bressoud et al. ............. 714/10 |
| 5,978,565 A | * | 11/1999 | Ohran et al. .................. 714/10 |
| 6,389,555 B2 | * | 5/2002 | Purcell et al. ................. 714/10 |
| 6,625,751 B1 | * | 9/2003 | Starovic et al. .............. 714/11 |
| 2002/0085506 A1 | * | 7/2002 | Hundscheidt et al. ....... 370/254 |

OTHER PUBLICATIONS

Pascal Felber et al. "Experiences, Strategies, and Challenges in Building Fault-Tolerant CORBA Systems", IEEE Transactions on Computers, vol. 53, No. 5, mai 2004 (2004-05), pp. 497-511, XP002312917 pp. 498, 502.

"Solid FlowEngine for Smart Networks—A Solid White Paper"; Internet, 'Online! 2002, XP002312916 Extrait de l' Internet: URL: http://www.dmreview.com/whitepaper/WID432.pdf> 'extrait le Jan. 4, 2005! p. 10.

P. Felber, P. Narasimhan: "Experiences, Strategies, and Challenges in Building Fault-Tolerant CORBA Systems" IEEE Transactions on Computers, vol. 53, no. 5, mai 2004 (2004-05), pp. 497-511, XP002312917 pp. 498, 502.

* cited by examiner

*Primary Examiner*—Robert Beausoliel
*Assistant Examiner*—Joseph D Manoskey
(74) *Attorney, Agent, or Firm*—Lowe Hauptman Ham & Berner, LLP

(57) ABSTRACT

A high availability, high performance software component architecture includes a primary configuration and at least one secondary configuration to take over from the primary configuration in the event of a failure thereof. The primary configuration includes at least one task processing component and a first client component and the secondary configuration includes at least one task processing component and one client component. Status data is present in both configurations and services for write access and read access for the task processing components are separated in such a way that status data read requests coming from the client components are divided between the configurations.

20 Claims, 6 Drawing Sheets

HIGH AVAILABILITY, HIGH PERFORMANCE SOFTWARE COMPONENT ARCHITECTURE

FIELD OF THE INVENTION

The present invention relates to a high availability, high performance software component architecture. It applies in particular to modular software component architectures, that are, for example, reusable, particularly when these architectures are part of redundant systems requiring a very high availability.

BACKGROUND OF THE INVENTION

As a general rule, the control or management of the systems is handled by information processing means based on computers, peripheral devices and appropriate interfaces, all these hardware components being coupled in a network. The availability of the systems in operation is a particularly sensitive point. Depending on the nature of the systems, the operational availability is more or less crucial.

The availability of the systems can therefore be very critical. It affects in particular the reliability of the systems, but also their profitability, for example. To ensure this operating availability, duplicating, or even triplicating, hardware and software component subsystems is known. This is what is called redundancy. Thus, in parallel with the main subsystem, also called the master system, there is at least one redundant subsystem or slave system. In the event of a shutdown of the master system, the slave system must take over the control of the system and therefore ensure the operating continuity. In practice, depending on the complexity of the systems, a subsystem comprises one to several computers and the associated peripheral devices. At least two criteria need to be considered to assess the performance of a redundant system, or, more specifically, to assess the availability performance of a system. Firstly, the integrity of the data and of the functions needs to be taken into account. The other important criterion is the response time of the slave system following the shutdown of the master system. There are systems for which operating shutdowns must be extremely short or even nonexistent, which means, for example, that the shutdown of operation on the computers lasts significantly less than one second, in the order of 500 milliseconds.

Moreover, the software architecture of the modern systems is normally based on a component approach, particularly for modular and reusable systems. The latter two properties are very important from the industrial and economic point of view. There are standard software component models, for example EJB, an acronym standing for "Enterprise Java Bean", or CCM, an acronym standing for "CORBA Component Model", which support an architecture based on the component approach. However, these software component models do not satisfy a high availability, high performance constraint. There is, for example, a model, FT CORBA, which satisfies the availability constraints, but it is an object-oriented model and not a software component-oriented, and therefore low level, model. This model is aimed at object CORBA, FT standing for "Fault Tolerance", which is an expression expressing availability.

SUMMARY OF THE INVENTION

One aim of the invention is in particular to make it possible to produce a high availability, high performance software architecture, this architecture being software component-oriented. To this end, the subject of the invention is a software component architecture comprising a primary configuration and at least one secondary configuration to take over from the primary configuration in the event of a failure thereof, the primary configuration comprising at least one task processing component and a first client component and the secondary configuration comprising at least one task processing component and one client component, the status data being present in both configurations. The services for write access and read access to the task processing components are separated in such a way that the status data read requests coming from the client components are divided up between the configurations.

In one embodiment, the first client component has read access to status data within the primary configuration and a client component of a secondary configuration has read access to the status data within its configuration. The primary configuration responds to the write requests from all the client components.

The detection of a failure of the primary configuration is, for example, handled by an object-oriented model testing, on each request initiated by a client component, the response from the task processing component. The model used is the FT CORBA model.

A data distribution service enables the status data to be copied from one configuration to the other. Each configuration is, for example, installed in a separate computer. The configurations can be interlinked by a multicast link, the accesses from one configuration to the other being handled via this link.

The main advantages of the invention are that it applies to the management of all types of systems, that it is based on existing low-level infrastructures, that it is suitable for numerous types of software configurations, that it is suitable for modular and reusable architectures, that it is cost-effective and that it is simple to implement.

BRIEF DESCRIPTION OF THE DRAWINGS

Other characteristics and advantages of the invention will become apparent from the description that follows, given in light of the appended drawings, which represent.

DETAILED DESCRIPTION

Figure 1A:
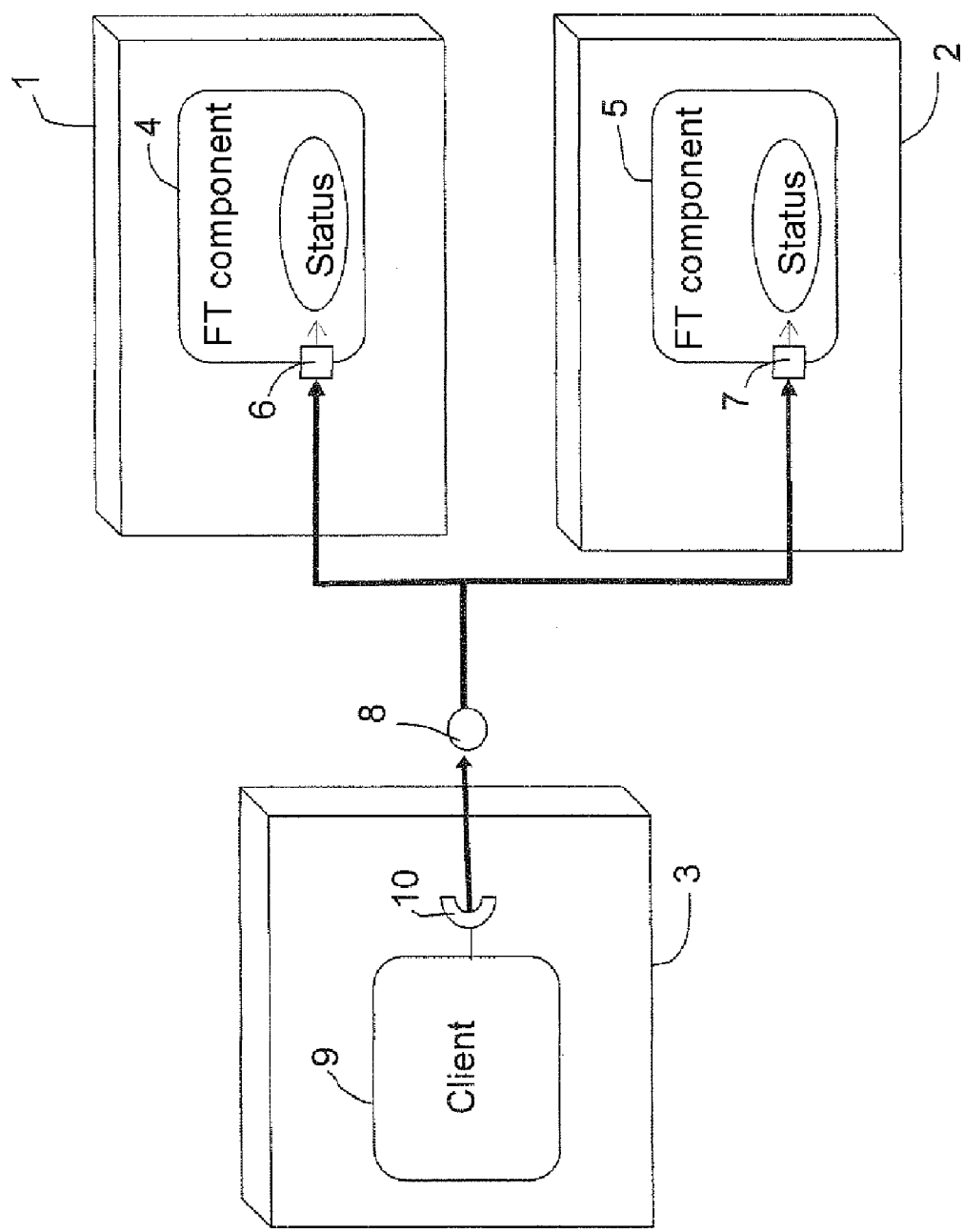
FIG. 1, an exemplary conventional redundant information processing embodiment.
Figure 1B:
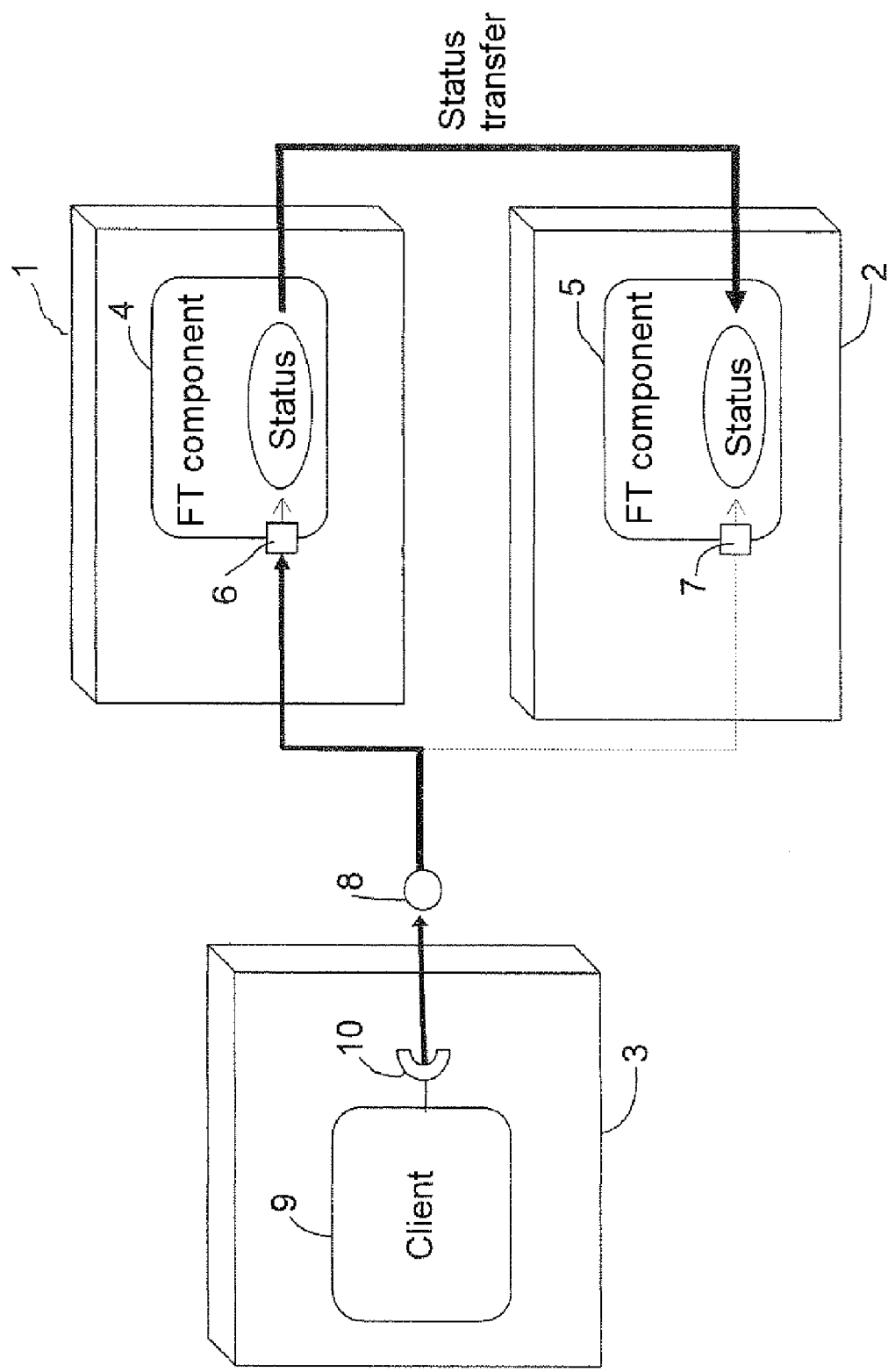

FIG. 1 represents an exemplary embodiment of a conventional redundant information processing system. This system comprises hardware components in which software components are installed. It comprises a master channel 1 and a slave channel 2, the latter being a replication of the master channel. To simplify the presentation, each channel comprises a single computer. A client station 3 is linked to the two computers 1, 2. The data interchanges between the client station and the computers are conducted by multicast link. Other client stations could address the computers. Each computer comprises software components 4, 5. Write/write access components 6, 8 and the appropriate interfaces enable the interchanges between the software components and the client 3.

There are at least two ways that such a redundant system can operate, an active way and a passive way. In the active way, the various components 4, 5 of each of the two channels 1, 2 execute the same instructions in parallel. However, only one channel, the master channel, responds to the requests from the client 3.

In the passive way, only the components of the master channel 1 carry out the processing. It receives the requests from the client station and handles the processing. The components of the slave channel 2 do not perform any processing. They remain inactive, in the standby state.

As indicated previously, an object-oriented model such as, for example, FT CORBA, which could satisfy the availability requirements, at the performance level cannot process the software components 4, 5 of the system.

Figure 2:
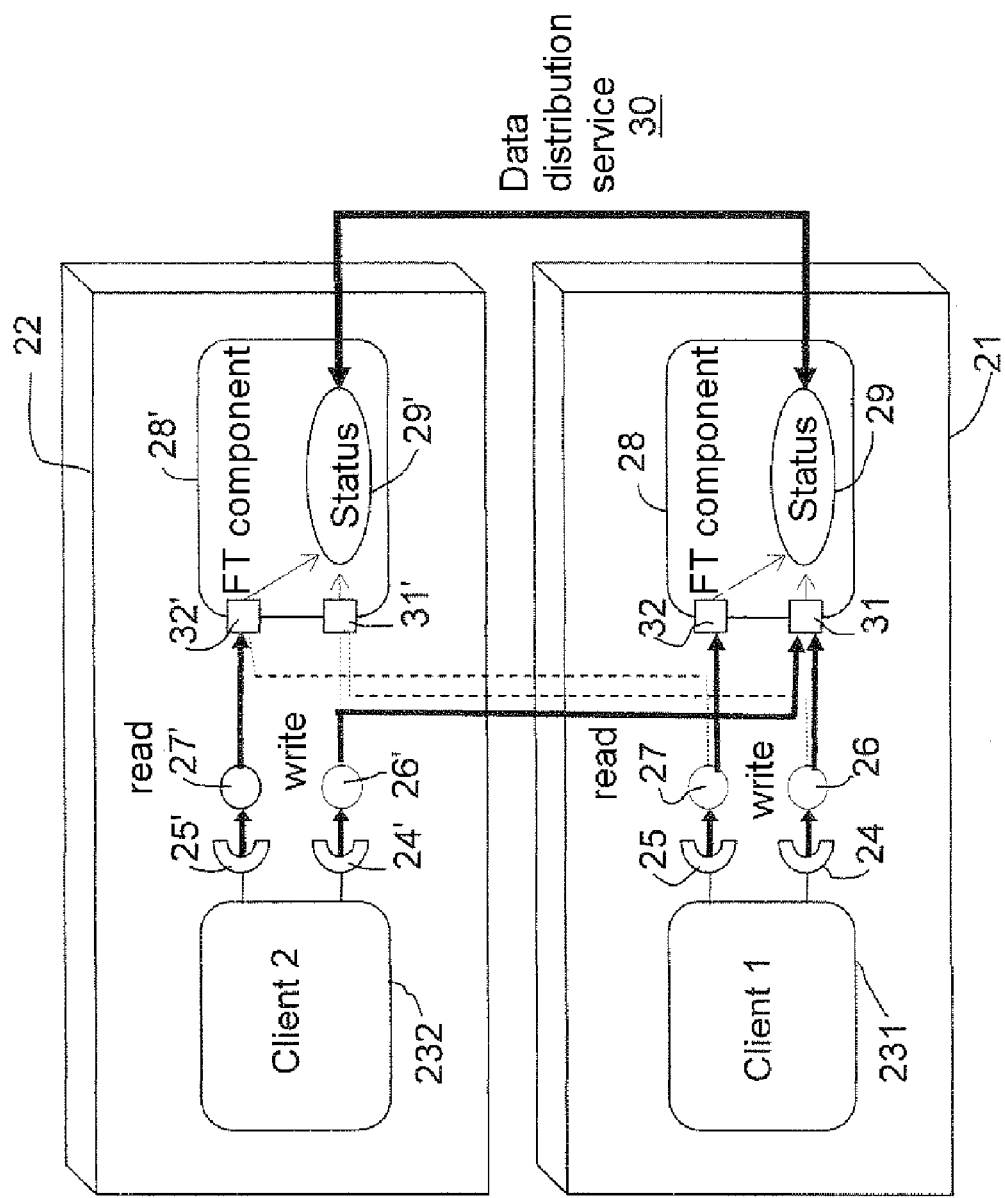
FIG. 2, an exemplary software component architecture according to the invention.

FIG. 2 shows an exemplary embodiment of a software component architecture according to the invention. To ensure the service availability, the system comprises two configurations, a primary configuration 21 and a secondary configuration 22, hereinafter called "back up" configuration. Each configuration is, for example, installed in a computer. The two computers are, for example, interlinked by a multicast link. The master configuration 21 comprises at least one client component 231 and software components 24, 25, 26, 27, 28. A software component 28 executes the processing operations. Service access software components 24, 25, 26, 27 link the client 23 to the processing software component 28. This task processing software component 28 is the component for which the availability is required. It will hereinafter be called FT component, referring to the acronym for "Fault Tolerance". A component 29 comprises the status of the system, this status being made up of the set of data. This status naturally changes over time. It could be located somewhere other than in the processing software component. The status component 29 can be incorporated in the FT component 28.

The backup configuration 22 comprises a replication 28' of the FT component 28 of the primary configuration 21. This FT component 28' is provided to execute the processing operations performed by the component 28 of the primary configuration in the event of failure of the latter. A component 29' is also designed to record the status of the system. This backup configuration 22 also comprises a client component 232 which is not necessarily a replication of the client 231 of the primary configuration, at least with regard to its functions in the overall system. It is, in fact, another client. The latter could have been located in the primary configuration or in another configuration. However, for reasons of standardization of the configurations, the second client is placed in the backup configuration. It is, for example, linked to the FT component 28' by the replications 24', 25', 26', 27' of the service access components 24, 25, 26, 27 of the primary configuration, in such a way that the software architecture of the backup configuration is a replication of the software architecture of the primary configuration. In the event of failure of the primary configuration, in particular of its FT component 28, the backup configuration is intended to take over via its FT component 28'. The two configurations are, for example, each hosted in a separate computer.

According to the invention, the status component 29 of the primary configuration and the status component 29' of the backup configuration permanently comprise the status of the system, that is, the data describing this status. In practice, it is all the data involved at a given instant in reconstructing the status of the system. Therefore, the data describing the status of the system is not only present in the primary configuration but also in the backup configuration. A data distribution service 30 enables the data from the status component 29 of the primary configuration 21 to be copied into the status component 29' of the backup configuration 22, and vice-versa. This distribution service is, for example, installed in the primary configuration 21, but not necessarily. The distribution is symbolized by a line in FIG. 2; it is a specific functional and non-physical link because the interchanges between the two configurations are conducted via a single physical link which is a multicast link. Other types of links could of course be considered, including dedicated links.

Service accesses to the FT component 28 of the primary configuration are conducted via two separate accesses, a write-dedicated access 26 and a read-dedicated access 27. A software interface 24 is associated with the write access service 26 and another software interface 25 is associated with the read access service 27. These interfaces 24, 25 are adapted to the client 231 in particular to enable it to access each of the services 26, 27, in write and in read modes.

Similarly, and in particular according to the replication of the software architecture of the primary configuration, access to the service of the FT component 28' of the backup configuration is separated into two, with a write access 26' and a read access 27'. The write access 26' is coupled not to the FT component 28' of the backup configuration, but to the FT component 28 of the primary configuration, in such a way that the second client has write access to this FT component 28 of the primary configuration. The software interfaces 24', 25' allow access to the services 26', 27' for the second client 232. The service links between the two configurations are, for example, via multicast link.

The FT component 28 of the primary configuration 21 and the FT component 28' of the backup configuration operate in parallel, that is, according to the active way described previously. Accesses to the services of the FT components 28, 28', however, do not operate in parallel. In particular, the FT component 28 of the primary configuration works in write/read mode and the FT component 28' of the backup configuration works in read mode only. This way, the FT component 28 of the primary configuration responds to the requests from the first client 231 and from the second client 232. The first client 231 reads the data on this FT component 28. As for the second client 232, it reads the data on the FT component 28'. This mode of operation is possible because the data is present in both configurations.

Thus, the services provided by an FT component are split on the one hand into write services and on the other hand into read services. The write services alter the status of the FT component and require management resources. In the exemplary embodiment of FIG. 2, only the FT component 28 of the primary configuration responds to the write accesses. The read access does not alter the status of the component. The two components 28, 28' can therefore respond to read service accesses, all the more so since the status of the system is replicated in each of the components, at least in the status components 29, 29'. The read accesses can involve complex processing operations and include notifications of services with selection criteria.

An architecture of a system according to the invention as presented by FIG. 1 makes it possible to improve the performance levels, in particular with regard to availability. The read and write requests from the first client 231 are processed by the FT component 28 of the primary configuration 21. Only the write requests from the second client 232 are processed by this FT component 28. The read requests from this second client 232 are processed directly by the FT component 28 of the backup configuration 22. Thus, the overall load is divided between the primary part and the backup part. The result is an improvement in performance.

Figure 3:
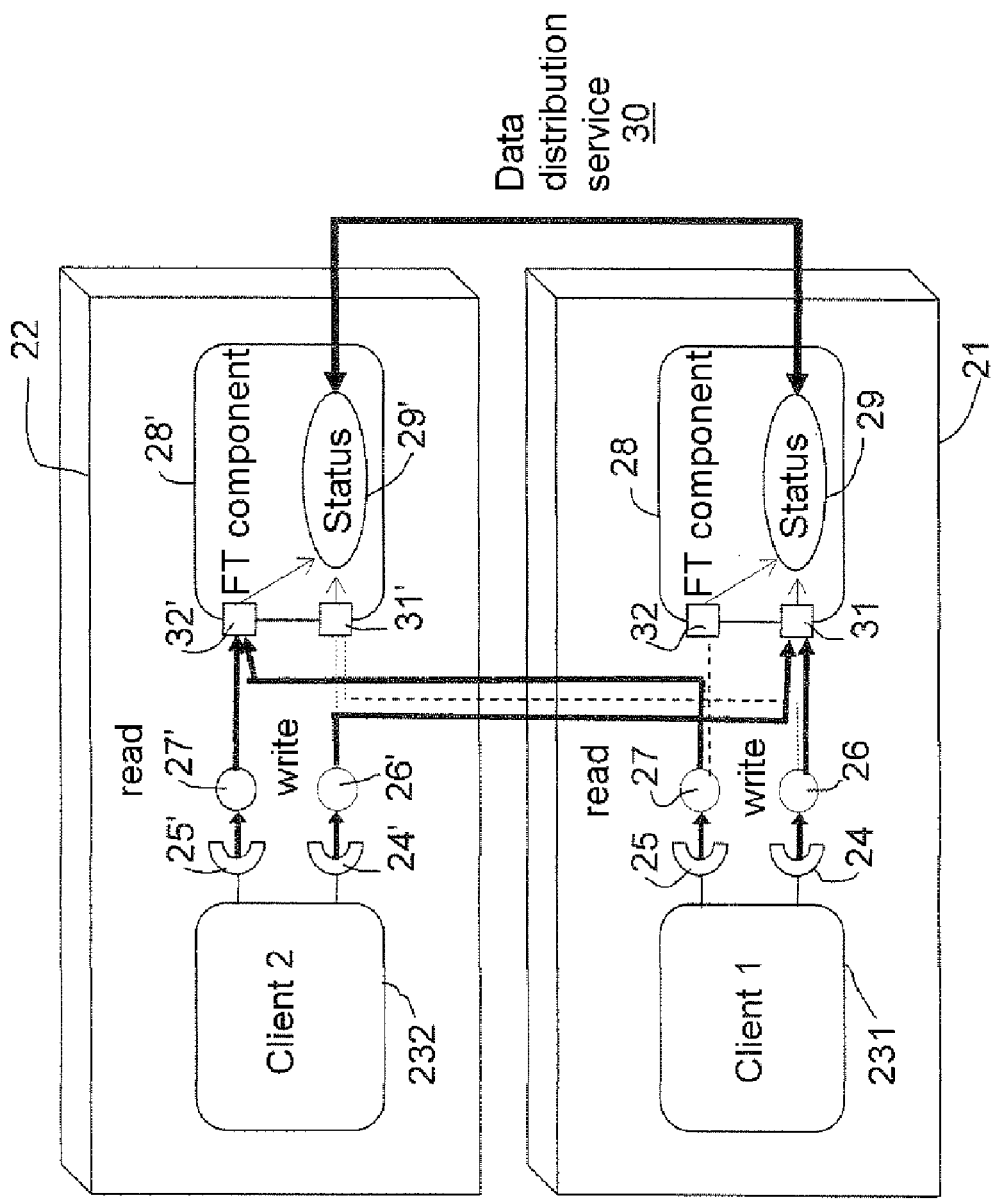
FIG. 3, by a partial view, another exemplary embodiment of an architecture according to the invention.

FIG. 3 is a partial view illustrating a variant of embodiment. FIG. 2 showed how separating write accesses from read accesses made it possible to divide the read requests between the different configurations. FIG. 2 shows a possible exemplary division of the read accesses. Other examples are possible. In the variant of embodiment of FIG. 3, the first client 232 also has read access to the FT component 28' of the backup configuration. In particular, the write access service 27 of the primary configuration is connected to the FT component 28' of the backup configuration. The primary part thus operates only in write access mode and the backup part operates only in read access mode, which contributes to a better division of the load. Nevertheless, this gain can be wiped out or at least strongly reduced by the fact that the link to the FT component 28' of the backup configuration from the access to the write service 27 of the primary configuration is via the multicast network 31. In practice, in the exemplary embodiment of FIG. 2, each configuration, client included, is installed on one and the same computer or at least on one and the same hardware system, which simplifies the links between components. The switchover to another computer or to another hardware structure entails using the multicast link with, in particular, all the associated protocols.

Figure 4:
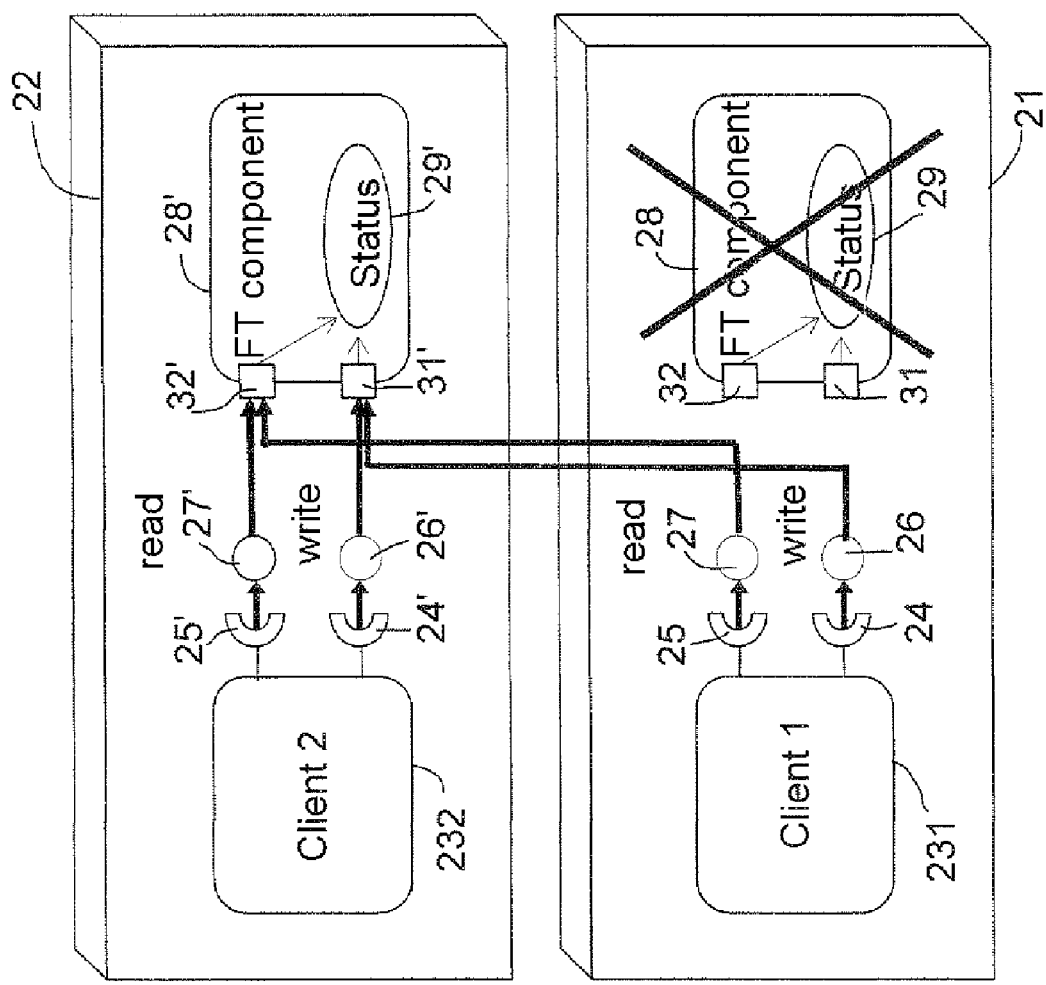
FIG. 4, an operating status in the event of failure of the primary part of the architecture.

FIG. 4 illustrates a case of failure of the primary configuration 21 where the processing is taken over by the backup configuration 22. More specifically, FIG. 4 presents a case where the FT component 28 of the primary configuration 21 is out of service. It is the FT component 28' of the backup configuration which then supports all the load and which in particular handles all the write and read services. In particular, the two write accesses 26, 26' that were connected to the FT component 28 of the primary part are connected to the FT component 28' of the backup part. The write access 27 of the primary part is now connected to this FT component 28'. The other connections remain unchanged. The improvement in the division of the load between the primary and backup configurations, as well as the fact that the status of the system is stored both in the primary configuration and in the backup configuration, together contribute to improving performance levels inasmuch as immediately the primary configuration fails, the backup configuration can very quickly take over. It is thus possible to hope, depending on circumstances, for a service unavailability of less than 500 milliseconds. This means that the duration between the occurrence of the failure of the primary configuration and the taking over by the backup configuration can be less than 500 milliseconds.

To achieve the new status illustrated by FIG. 4 where the backup configuration has taken over the role of the failed primary configuration, means are required to detect the failure of the primary configuration and to elect a new primary configuration. In the case of the example of FIGS. 3 and 4 where there are only two configurations, the choice falls on the single available configuration. Means are also required to divert the requests from the clients, in this case the first client in the case of FIGS. 3 and 4, to the new primary configuration. In particular, it is necessary to divert the write and read access services connected to the FT component 28 of the primary configuration to the FT component 28' of the backup configuration. To achieve this, the system according to the invention uses a low-level structure which processes the software objects. The object-oriented model used is, for example, the FT CORBA model.

Figure 5:
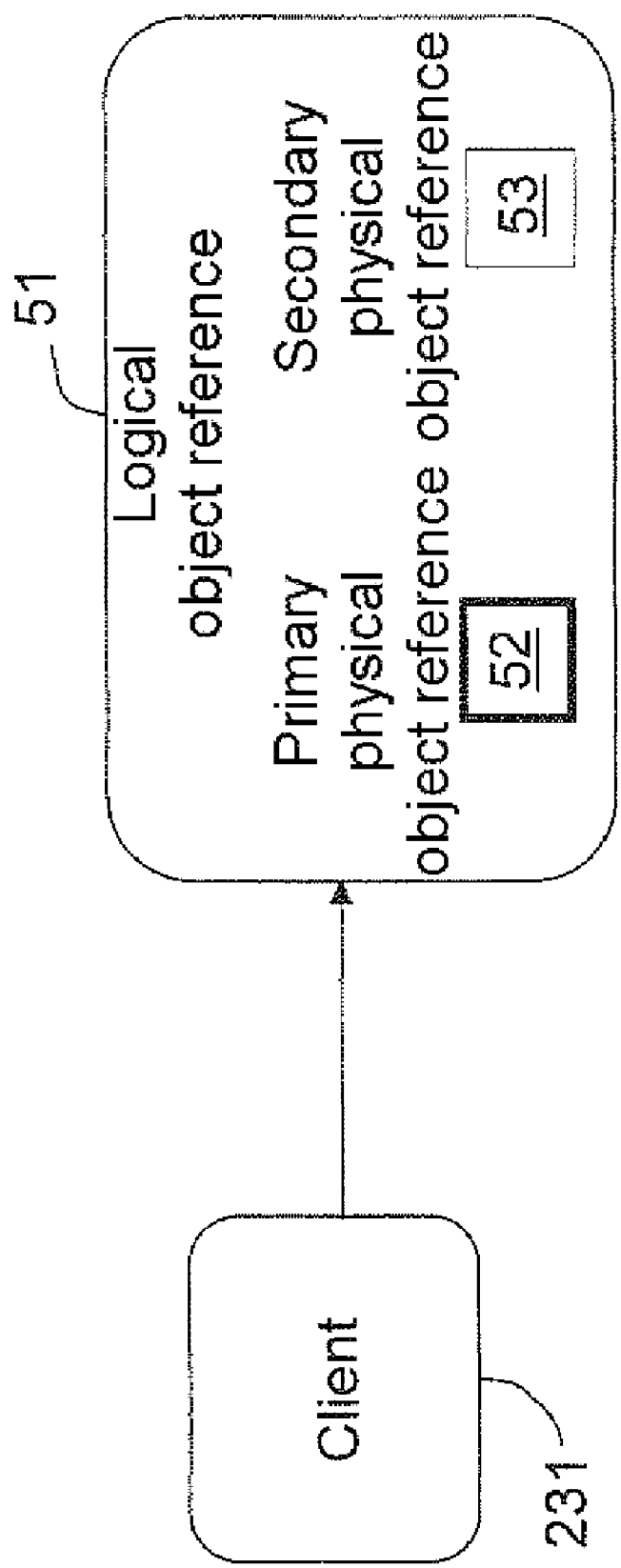
FIG. 5, an illustration of a low-level mechanism detecting in particular the failures of the software components.

FIG. 5 illustrates an exemplary low-level infrastructure which makes it possible to meet the abovementioned requirements, in particular for the detection of failures and to divert the requests. The FT CORBA model matches the illustrated mechanism. Other model types which match this mechanism or similar mechanisms could be used. FIG. 5 therefore illustrates a low-level software infrastructure. The client 231 dialogs with a software object 51 which contains a reference. As a general rule, a client needs a reference to communicate. The software object in fact comprises at least two references, the reference of the code of a primary copy 52, intended for a conformity test, contained in the primary configuration 21, and the reference of the code of a secondary copy 53 contained in the backup configuration 22. When the client initiates a communication, for a read or write request, it first tests the primary copy. If the latter conforms to the reference, this means that the FT component 28 of the primary configuration is in service. If the test is negative, this means that the FT component 28 is no longer responding and therefore that it is in service. The FT CORBA model for example diverts the same request to the secondary copy, then diverts all the access services to the FT component 28' of the secondary configuration. The FT CORBA model is particularly well suited because it contains a reference test in its access protocols. Being able to detect the failed components, the model can then orient the accesses to the components that are in service.

The exemplary embodiments of architectures described previously comprise only two configurations 21, 22. The invention obviously applies to systems comprising a greater number of replications. It is possible, for example, to envisage N replications of the primary configuration 21. In this case, the primary part 21 responds to the write requests from all the clients. The first client component 231 has read access to the status data in the primary configuration 21 and a client component 232 of a secondary configuration 22 has read access to the status data in its configuration 22. In the event of failure of the primary configuration, a secondary configuration takes over the processing operations handled by the latter and in turn becomes the primary configuration. In another exemplary embodiment, the primary configuration, and its replications, can comprise a number of clients.

In particular, the invention is well suited to a modular and reusable global architecture. In practice, the various configurations and their replications can constitute reusable modules. In this respect, in addition to the modular and reusable aspect, the invention is also cost-effective.

Advantageously, the invention applies to the management of all types of systems, in particular for large systems where dependability demands a high availability and a high performance in their control or management systems. Moreover, the invention is simple to implement, it does not in particular require additional components or complex connections. It is based on existing low-level infrastructures and is suited to numerous types of software configurations, which affords it a wide range of applications.

The invention claimed is:

1. A software component architecture, comprising:
a first computer comprising a primary configuration and at least a second computer comprising at least one secondary configuration, the secondary configuration configured to take over from the primary configuration in the event of a failure thereof;
wherein the primary configuration has a task processing component and a first client component and the secondary configuration has a task processing component and one client component, status data being present in both configurations;
wherein services for write access and read access to the task processing components are separated in such a way that the status data read requests coming from the client components are divided up between the configurations;

wherein the configurations are interlinked by a multicast link; and wherein the first client component has read access to status data within the primary configuration and a client component of the secondary configuration has read access to the status data within the second configuration.

2. The architecture as claimed in claim 1, wherein the primary configuration responds to the write requests from all the client components.

3. The architecture as claimed in claim 1, wherein the detection of a failure of the primary configuration is handled by an object-oriented model testing, on each request initiated by a client component, the response from the task processing component.

4. The architecture as claimed in claim 3, wherein the model is the FT CORBA model.

5. The architecture as claimed in claim 1, comprising a data distribution service for copying the status data from one configuration to the other.

6. The architecture as claimed in claim 1, wherein each configuration is installed in a separate computer.

7. The architecture as claimed in claim 1, wherein the configurations are interlinked by a multicast link, the accesses from one configuration to the other being handled via this link.

8. The architecture as claimed in claim 1, wherein the primary configuration responds to the write requests from all the client components.

9. The architecture as claimed in claim 1, wherein the detection of a failure of the primary configuration is handled by an object-oriented model testing, on each request initiated by a client component, the response from the task processing component.

10. The architecture as claimed in claim 2, wherein the detection of a failure of the primary configuration is handled by an object-oriented model testing, on each request initiated by a client component, the response from the task processing component.

11. The architecture as claimed in claim 1, comprising a data distribution service for copying the status data from one configuration to the other.

12. The architecture as claimed in claim 2, comprising a data distribution service for copying the status data from one configuration to the other.

13. The architecture as claimed in claim 3, comprising a data distribution service for copying the status data from one configuration to the other.

14. The architecture as claimed in claim 4, comprising a data distribution service for copying the status data from one configuration to the other.

15. The architecture as claimed in claim 1, wherein the accesses from one configuration to the other being handled via the multicast link.

16. The architecture as claimed in claim 2, wherein the accesses from one configuration to the other being handled via the multicast link.

17. The architecture as claimed in claim 3, wherein the accesses from one configuration to the other being handled via the multicast link.

18. The architecture as claimed in claim 4, wherein the accesses from one configuration to the other being handled via the multicast link.

19. The architecture as claimed in claim 5, wherein the accesses from one configuration to the other being handled via the multicast link.

20. A computer usable medium including a program for storing a software component architecture, the computer usable medium comprising:

computer program code that when executed causes a primary configuration and at least one secondary configuration to take over from the primary configuration in the event of a failure thereof;

computer program code that executes for the primary configuration a first task processing component and a first client component and executes for the secondary configuration a second task processing component and a second client component, wherein services for write access and read access to the task processing components are separated in such a way that status data read requests coming from the client components in both configurations, are divided up between the configurations;

computer program code that provides the first client component with read access to status data within the primary configuration; and computer program code that provides the second client component of the secondary configuration with read access to the status data within the second configuration.

* * * * *